(12) United States Patent
Adachi et al.

(10) Patent No.: US 7,000,718 B2
(45) Date of Patent: Feb. 21, 2006

(54) POWER OUTPUT APPARATUS AND HYBRID VEHICLE WITH POWER OUTPUT APPARATUS MOUNTED THEREON

(75) Inventors: Masatoshi Adachi, Susono (JP); Masahiro Kojima, Susono (JP); Koichi Kondo, Toyoake (JP); Hiroshi Hata, Susono (JP); Keijiro Oshima, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 63 days.

(21) Appl. No.: 10/725,085

(22) Filed: Dec. 2, 2003

(65) Prior Publication Data

US 2004/0108149 A1 Jun. 10, 2004

Related U.S. Application Data

(63) Continuation of application No. PCT/JP02/08464, filed on Aug. 22, 2002, now abandoned.

(30) Foreign Application Priority Data

Aug. 28, 2001 (JP) .............................. 2001-258513

(51) Int. Cl.
*B60K 6/00* (2006.01)
(52) U.S. Cl. ..................................... 180/65.2; 180/65.6
(58) Field of Classification Search ............... 180/65.2, 180/65.3, 65.4, 65.6, 65.7; 475/5
See application file for complete search history.

(56) References Cited

U.S. PATENT DOCUMENTS

| 4,233,858 A | * | 11/1980 | Rowlett ......................... 475/5 |
| 4,372,414 A | * | 2/1983 | Anderson et al. ........... 180/165 |
| 4,382,484 A | * | 5/1983 | Anderson et al. ........... 180/165 |

(Continued)

FOREIGN PATENT DOCUMENTS

JP 08-197962 A 8/1996

(Continued)

OTHER PUBLICATIONS

Translated International Preliminary Examination Report of PCT/JP02/08464 filed Aug. 22, 2002 (Form PCT/IPEA/409).

*Primary Examiner*—Christopher P. Ellis
*Assistant Examiner*—Bridget Avery
(74) *Attorney, Agent, or Firm*—Oliff & Berridge, PLC

(57) ABSTRACT

A hybrid vehicle may run with only the power from a motor MG2, while an engine is at a stop. In this state, the control procedure drives a motor MG1 to rotate a crankshaft at an idling engine speed for a predetermined time period, when at least one of an observed oil temperature in a sump, an observed temperature of the motor MG1, an observed temperature of the motor MG2, an observed revolving speed of the motor MG1, and an observed revolving speed of the motor MG2 is not less than a corresponding preset value. Rotation of the crankshaft at the idling engine speed results in driving an oil pump to feed a supply of lubricating oil to mechanical part of the power output apparatus including a power distribution integration mechanism.

16 Claims, 5 Drawing Sheets

U.S. PATENT DOCUMENTS

| | | | |
|---|---|---|---|
| 4,387,783 A | * | 6/1983 | Carman ...................... 180/165 |
| 4,441,573 A | * | 4/1984 | Carman et al. ............. 180/165 |
| 5,195,600 A | * | 3/1993 | Dorgan ....................... 180/9.1 |
| 5,285,111 A | * | 2/1994 | Sherman ..................... 290/4 C |
| 5,669,842 A | * | 9/1997 | Schmidt ........................ 475/5 |
| 5,799,744 A | * | 9/1998 | Yamaguchi et al. ....... 180/65.2 |
| 5,823,282 A | | 10/1998 | Yamaguchi |
| 5,826,671 A | * | 10/1998 | Nakae et al. .............. 180/65.2 |
| 5,845,731 A | * | 12/1998 | Buglione et al. .......... 180/65.2 |
| 5,847,470 A | * | 12/1998 | Mitchell ...................... 290/45 |
| 5,915,489 A | * | 6/1999 | Yamaguchi ................ 180/65.2 |
| 5,934,395 A | * | 8/1999 | Koide et al. ............... 180/65.2 |
| 5,935,035 A | * | 8/1999 | Schmidt ........................ 475/5 |
| 6,149,544 A | * | 11/2000 | Masberg et al. ............... 477/13 |
| 6,155,364 A | * | 12/2000 | Nagano et al. ............ 180/65.2 |

FOREIGN PATENT DOCUMENTS

| | | |
|---|---|---|
| JP | 08-324262 A | 12/1996 |
| JP | A 09-056009 | 2/1997 |
| JP | A 10-089446 | 4/1998 |
| JP | A 2000-296720 | 10/2000 |
| JP | 2000-335263 A | 12/2000 |
| JP | A 2001-193518 | 7/2001 |
| JP | A 2001-224104 | 8/2001 |

* cited by examiner

POWER OUTPUT APPARATUS AND HYBRID VEHICLE WITH POWER OUTPUT APPARATUS MOUNTED THEREON

CROSS REFERENCE TO RELATED APPLICATION

This is a continuation of Application PCT/JP02/08464, filed Aug. 22, 2002, now abandoned.

BACKGROUND OF THE INVENTION

1. Field of the Invention

The present invention relates to a power output apparatus and a hybrid vehicle with a power output apparatus mounted thereon. More specifically the invention pertains to a power output apparatus that outputs power to a drive shaft, as well as to a hybrid vehicle with such a power output apparatus mounted thereon.

2. Description of the Prior Art

Various power output apparatuses mounted on a hybrid vehicle have been proposed, where an output shaft of an internal combustion engine and rotating shafts of two motors are connected with respective shafts of a planetary gear (for example, JAPANESE PATENT LAID-OPEN GAZETTE No. 9-56009). The power output apparatus has an oil pump that feeds a supply of lubricating oil to mechanical part including the planetary gear and is attached to the output shaft of the internal combustion engine or a drive shaft.

In a hybrid vehicle with the power output apparatus including the oil pump attached to the output shaft of the internal combustion engine, however, a sufficient supply of lubricating oil to the planetary gear is not assured in an EV drive mode, where the hybrid vehicle runs with the power from the motor, while the internal combustion engine is at a stop. In a hybrid vehicle with the power output apparatus including the oil pump attached to the drive shaft, on the other hand, a sufficient supply of lubricating oil to the planetary gear is not ensured in a stop-time charging mode, where a battery mounted on the hybrid vehicle is charged with power from the internal combustion engine, while the vehicle is at a stop.

One possible measure against this problem attaches separate oil pumps to the output shaft of the internal combustion engine and to the drive shaft. Attachment of the multiple oil pumps, however, undesirably increases the number of components included in the vehicle and raises the total weight of the vehicle. Another possible measure uses an electrically-driven oil pump that does not gain the power from the output shaft of the internal combustion engine or the drive shaft. This electrically-driven oil pump converts the power output from the internal combustion engine into electric power and actuates with the converted electric power. The electrically-driven oil pump thus lowers the overall energy efficiency of the vehicle, compared with the oil pump that actuates with the power from the output shaft of the internal combustion engine.

SUMMARY OF THE INVENTION

The power output apparatus of the invention aims to actuate lubricating oil supply means, which is driven with power from an output shaft of an internal combustion engine, and ensure a required supply of lubricating oil, even while the internal combustion engine is at a stop. The power output apparatus of the invention also aims at smooth lubrication of mechanical part. The hybrid vehicle of the invention aims to reduce the number of components and still improve the overall energy efficiency of the vehicle.

In order to attain at least part of the above and the other related objects, the power output apparatus of the invention and the hybrid vehicle with the power output apparatus mounted thereon have the constructions discussed below.

A power output apparatus of the invention outputs power to a drive shaft and includes: an internal combustion engine; a drive shaft motor that is capable of inputting and outputting power to and from the drive shaft; a three-shaft-type power input output mechanism connecting with an output shaft of the internal combustion engine, the drive shaft, and a rotating shaft, where settings of power input and output to and from any two shafts among the three shafts automatically specify a setting of power input and output to and from a residual shaft among the three shafts; a rotating shaft motor that is capable of inputting and outputting power to and from the rotating shaft; a secondary battery that transmits electric power to and from the drive shaft motor and the rotating shaft motor; a lubricating oil feed pump that is driven by power of the output shaft of the internal combustion engine to feed a supply of lubricating oil to at least a portion of mechanical part of the power output apparatus; and a controller that, when a predetermined condition is fulfilled in an operation stop state of the internal combustion engine, controls actuation of the rotating shaft motor to drive the lubricating oil feed pump with the power output to the output shaft of the internal combustion engine via the three-shaft-type power input output mechanism.

The power output apparatus of the invention controls actuation of the rotating shaft motor to drive the lubricating oil feed pump with the power output to the output shaft of the internal combustion engine via the three-shaft-type power input output mechanism, when the predetermined condition is fulfilled in the operation stop state of the internal combustion engine. Namely the control drives the rotating shaft motor to ensure output of the power, which is required for actuation of the lubricating oil feed pump, to the output shaft of the internal combustion engine. This arrangement activates the lubricating oil feed pump to ensure the supply of lubricating oil to at least a portion of the mechanical part of the power output apparatus, which requires the supply of lubricating oil, even when the internal combustion engine is at a stop. The lubricating oil feed pump is connected to the output shaft of the internal combustion engine via the damper. The rotating shaft motor, the drive shaft motor, and the lubricating oil feed pump are arranged in series.

In one preferable application of the power output apparatus of the invention, the predetermined condition applied for the control executed by the controller is an ON condition of a starter switch for starting the power output apparatus. This arrangement ensures the supply of lubricating oil to at least a portion of the mechanical part of the power output apparatus, which requires the supply of lubricating oil at a start of the power output apparatus.

In this application of the power output apparatus of the invention where the lubricating oil feed pump is driven in the ON condition of the starter switch, the controller may adopt a condition that an elapsed time since a stop of operation of the power output apparatus reaches at least a preset time period, as the predetermined condition of the control. The supplied lubricating oil drips from the mechanical part to be accumulated in a sump with elapse of time. Actuation of the lubricating oil feed pump after elapse of the preset time period since the stop of operation thus ensures a sufficient supply of lubricating oil to the mechanical part, which requires the supply of lubricating oil.

The power output apparatus of this application, in which the lubricating oil feed pump is driven in the ON condition of the starter switch, may further have a temperature sensor that measures temperature of the lubricating oil. In this embodiment, the controller adopts a condition that the temperature of the lubricating oil measured by the temperature sensor is not less than a preset first lubricating oil temperature in an operation stop state of the power output apparatus immediately before an ON operation of the starter switch, as the predetermined condition of the control. In another embodiment, the controller adopts a condition that the temperature of the lubricating oil measured by the temperature sensor is not greater than a preset second lubricating oil temperature at an ON time of the starter switch, as the predetermined condition of the control. The lubricating oil has the lower viscosity at the higher temperature. The higher temperature of the lubricating oil at the stop time of operation of the power output apparatus enhances the easiness in dripping of the lubricating oil from the mechanical part to be accumulated in the sump. The lubricating oil feed pump is activated when the temperature of the lubricating oil in the operation stop state of the power output apparatus is not less than the preset first lubricating oil temperature, which reflects the easiness in dripping of the lubricating oil from the mechanical part. This ensures a sufficient supply of lubricating oil to the mechanical part, which requires the supply of lubricating oil. The lubricating oil generally has the higher viscosity and the difficulty in circulation at the lower temperature. The lower temperature of the lubricating oil indicates the longer elapsed time since the stop of operation of the power output apparatus. The lubricating oil feed pump is thus activated when the temperature of the lubricating oil at the ON time of the starter switch is not greater than the preset second lubricating oil temperature, which reflects the difficulty in circulation of the lubrication oil and the elapsed time since the stop of operation of the power output apparatus. This arrangement ensures a sufficient supply of lubricating oil to the mechanical part, which requires the supply of lubricating oil.

Moreover, the power output apparatus of the application, in which the lubricating oil feed pump is driven in the ON condition of the starter switch, may have a temperature sensor that measures temperature of the drive shaft motor. In this embodiment, the controller adopts a condition that the temperature of the drive shaft motor measured by the temperature sensor is not less than a preset first motor temperature in an operation stop state of the power output apparatus immediately before an ON operation of the starter switch, as the predetermined condition of the control. In another embodiment, the controller adopts a condition that the temperature of the drive shaft motor measured by the temperature sensor is not greater than a preset second motor temperature at an ON time of the starter switch, as the predetermined condition of the control. Furthermore, the power output apparatus of the application, in which the lubricating oil feed pump is driven in the ON condition of the starter switch, may have a temperature sensor that measures temperature of the rotating shaft motor. In this embodiment, the controller adopts a condition that the temperature of the rotating shaft motor measured by the temperature sensor is not less than a preset third motor temperature in an operation stop state of the power output apparatus immediately before an ON operation of the starter switch, as the predetermined condition of the control. In another embodiment, the controller adopts a condition that the temperature of the rotating shaft motor measured by the temperature sensor is not greater than a preset fourth motor temperature at an ON time of the starter switch, as the predetermined condition of the control. The temperatures of the drive shaft motor and the rotating shaft motor in the operation stop state of the power output apparatus reflect the temperature of the lubricating oil at the moment and the easiness in dripping of the lubricating oil from the mechanical part. The lubricating oil feed pump is activated when the temperature of the drive shaft motor or the temperature of the rotating shaft motor in the operation stop state of the power output apparatus is respectively not less than the preset first motor temperature or not less than the preset third motor temperature, which reflects the easiness in dripping of the lubricating oil from the mechanical part. This arrangement ensures a sufficient supply of lubricating oil to the mechanical part, which requires the supply of lubricating oil. The temperatures of the drive shaft motor and the rotating shaft motor at the ON time of the starter switch reflect the temperature of the lubricating oil at the moment, the easiness in circulation of the lubricating oil to the mechanical part, and the elapsed time since the stop of operation of the power output apparatus. The lubricating oil feed pump is thus activated when the temperature of the drive shaft motor or the temperature of the rotating shaft motor at the ON time of the starter switch is respectively not greater than the preset second motor temperature or not greater than the preset fourth motor temperature, which reflects the easiness in circulation of the lubricating oil to the mechanical part and the elapsed time since the stop of operation of the power output apparatus. This arrangement ensures a sufficient supply of lubricating oil to the mechanical part, which requires the supply of lubricating oil.

The power output apparatus of the application, in which the lubricating oil feed pump is driven in the ON condition of the starter switch, may have a temperature sensor that measures temperature of the internal combustion engine. In this embodiment, the controller adopts a condition that the temperature of the internal combustion engine measured by the temperature sensor is not greater than a preset combustion engine temperature at an ON time of the starter switch, as the predetermined condition of the control. The temperature of the internal combustion engine at the ON time of the starter switch reflects the temperature of the lubricating oil at the moment, the easiness in circulation of the lubricating oil to the mechanical part, and the elapsed time since the stop of operation of the power output apparatus. The lubricating oil feed pump is thus activated when the temperature of the internal combustion engine at the ON time of the starter is not greater than the preset internal combustion engine temperature, which reflects the easiness in circulation of the lubricating oil to the mechanical part and the elapsed time since the stop of operation of the power output apparatus. This arrangement ensures a sufficient supply of lubricating oil to the mechanical part, which requires the supply of lubricating oil. The temperature of the internal combustion engine includes the temperature of the internal combustion engine itself and the temperature of a cooling medium used for cooling the internal combustion engine.

In the application of the power output apparatus of the invention where the lubricating oil feed pump is driven in the ON condition of the starter switch, the controller may adopt a condition that makes the drive shaft motor output power to the drive shaft, as the predetermined condition of the control. This condition causes the drive shaft motor to output the power to the drive shaft, while the internal combustion engine is at a stop. When the internal combustion engine is actuated immediately after a start of the power output apparatus, the lubricating oil feed pump is driven with the power from the internal combustion engine to feed a supply of lubricating oil to the mechanical part, which requires the supply of lubricating oil. In the case of direct output of the power from the drive shaft motor to the drive shaft, however, the lubricating oil feed pump is not driven and no supply of lubricating oil is fed to the mechanical part, which requires the supply of lubricating oil. Actuation of the lubricating oil feed pump at the timing of activation of the starter switch to make the drive shaft motor output power to the drive shaft effectively ensures a sufficient supply of lubricating oil to the mechanical part, which requires the supply of lubricating oil.

In the power output apparatus of the invention, the controller may adopt a condition that the drive shaft motor is outputting power to the drive shaft, as the predetermined condition of the control. When the drive shaft motor is outputting power to the drive shaft in the operation stop state of the internal combustion engine, the output shaft of the internal combustion engine generally stops its rotation. No power is thus given from the output shaft of the internal combustion engine to the lubricating oil feed pump. In this state, the rotating shaft motor is driven to activate the lubricating oil feed pump and thereby feed a supply of lubricating oil to the mechanical part, which requires the supply of lubricating oil.

The power output apparatus of this application, in which the lubricating oil feed pump is actuated under the condition that the drive shaft motor is outputting power to the drive shaft in the operation stop state of the internal combustion engine, may further have a temperature sensor that measures temperature of the lubricating oil. In this embodiment, the controller adopts a condition that the temperature of the lubricating oil measured by the temperature sensor is not less than a preset third lubricating oil temperature, as the predetermined condition of the control. The temperature of the lubricating oil reflects the temperature of the mechanical part, which requires the lubricating oil. The higher temperature of the lubricating oil leads to the higher temperature of the mechanical part, which requires the lubricating oil, and heightens the potential for a burn-out of the mechanical part. The lubricating oil feed pump is thus driven when the temperature of the lubricating oil is not less than the preset third lubricating oil temperature, which reflects the potential for a burn-out of the mechanical part. This arrangement ensures a sufficient supply of lubricating oil to the mechanical part, which requires the supply of lubricating oil and has the potential for a burn-out.

The power output apparatus of this application, in which the lubricating oil feed pump is actuated under the condition that the drive shaft motor is outputting power to the drive shaft in the operation stop state of the internal combustion engine, may further have a temperature sensor that measures temperature of the drive shaft motor. In this embodiment, the controller adopts the temperature of the drive shaft motor measured by the temperature sensor is not less than a preset fifth motor temperature, as the predetermined condition of the control. The power output apparatus of this application may further have a temperature sensor that measures temperature of the rotating shaft motor. In this embodiment, the controller adopts the temperature of the rotating shaft measured by the temperature sensor is not less than a preset sixth motor temperature, as the predetermined condition of the control. The temperatures of the drive shaft motor and the rotating shaft motor reflect the temperature of the lubricating oil and the temperature of the mechanical part, which requires the supply of lubricating oil. The higher temperatures of the drive shaft motor and the rotating shaft motor lead to the higher temperature of the mechanical part, which requires the lubricating oil, and heightens the potential for a burn-out of the mechanical part. The lubricating oil feed pump is thus driven when the temperature of the drive shaft motor or the temperature of the rotating shaft motor is respectively not less than the preset fifth lubricating oil temperature or not less than the preset sixth lubricating oil temperature, which reflects the potential for a burn-out of the mechanical part. This arrangement ensures a sufficient supply of lubricating oil to the mechanical part, which requires the supply of lubricating oil and has the potential for a burn-out.

The power output apparatus of this application, in which the lubricating oil feed pump is actuated under the condition that the drive shaft motor is outputting power to the drive shaft in the operation stop state of the internal combustion engine, may further have a speed sensor that measures a revolving speed of the drive shaft. In this embodiment, the controller adopts a condition that the revolving speed of the drive shaft measured by the speed sensor is not less than a preset first revolving speed, as the predetermined condition of the control. The power output apparatus of the invention may further have a speed sensor that measures a revolving speed of the rotating shaft. In this embodiment, the controller adopts a condition that the revolving speed of the rotating shaft measured by the speed sensor is not less than a preset second revolving speed, as the predetermined condition of the control. The revolving speeds of the drive shaft and the rotating shaft reflect the temperature of the lubricating oil raised by mechanical frictional energy and the temperature of the mechanical part, which requires the supply of lubricating oil. The higher revolving speeds of the drive shaft and the rotating shaft lead to the higher temperature of the mechanical part, which requires the lubricating oil, and heightens the potential for a burn-out of the mechanical part. The lubricating oil feed pump is thus driven when the revolving speed of the drive shaft or the revolving speed of the rotating shaft is respectively not less than the preset first revolving speed or not less than the preset second revolving speed, which reflects the potential for a burn-out of the mechanical part. This arrangement ensures a sufficient supply of lubricating oil to the mechanical part, which requires the supply of lubricating oil and has the potential for a burn-out.

In one application of the power output apparatus of the invention, the controller controls actuation of the rotating shaft motor to drive the lubricating oil feed pump for a predetermined time period, when the predetermined condition is fulfilled. The arrangement enables just a required quantity of lubricating oil to be fed to the mechanical part. This desirably prevents unnecessary energy consumption and thus improves the overall energy efficiency of the power output apparatus.

In still another application of the power output apparatus of the invention, the controller controls actuation of the rotating shaft motor to rotate the output shaft of the internal combustion engine at a predetermined revolving speed. In this application of the power output apparatus of the invention, the predetermined revolving speed may be approximate to an idling engine speed. The lubricating oil feed pump is generally designed to exert its functions when the internal combustion engine is driven at the idling engine speed. The actuation control of the rotating shaft motor thus drives the lubricating oil feed pump to rotate the output shaft of the internal combustion engine at the revolving speed approximate to the idling engine speed. This arrangement desirably prevents unnecessary energy consumption.

In the power output apparatus of the invention, the lubricating oil feed pump may feed the supply of lubricating oil to the three-shaft-type power input output mechanism. This arrangement ensures a sufficient supply of lubricating oil to the three-shaft-type power input output mechanism.

The power output apparatus of the invention is mounted on a hybrid vehicle having a drive shaft that is mechanically linked with drive wheels. The hybrid vehicle of this arrangement effectively ensures actuation of the lubricating oil feed pump to feed the supply of lubricating oil to at least a portion of the mechanical part of the power output apparatus, which requires the supply of lubricating oil, even while the internal combustion engine is at a stop. The hybrid vehicle also exerts the function of feeding the supply of lubricating oil to the mechanical part according to the requirements and has the improved overall energy efficiency.

DESCRIPTION OF THE PREFERRED EMBODIMENTS

One mode of carrying out the invention is discussed below as a preferred embodiment.

Figure 1:
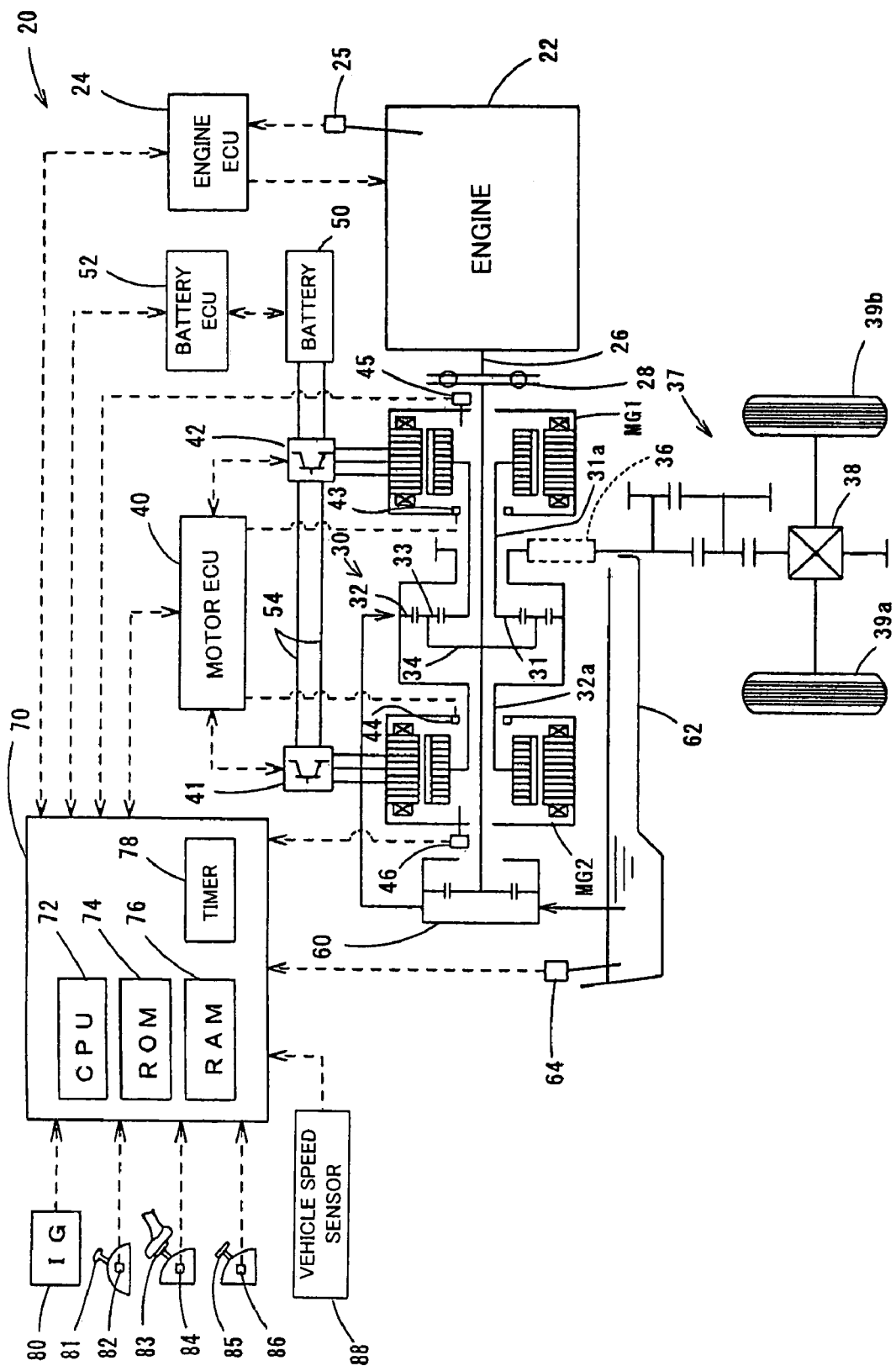
FIG. 1 schematically illustrates the construction of a hybrid vehicle 20 with a power output apparatus mounted thereon in one embodiment of the invention.

FIG. 1 schematically illustrates the construction of a hybrid vehicle 20 with a power output apparatus mounted thereon in one embodiment of the invention. The hybrid vehicle 20 of the embodiment includes an engine 22, a three-shaft-type power distribution integration mechanism 30 connecting with a crankshaft 26 or an output shaft of the engine 22 via a damper 28, a motor MG1 that is connected with the power distribution integration mechanism 30 and is capable of generating electric power, a MG2 that is also connected with the power distribution integration mechanism 30, an oil pump 60 that feeds a supply of lubricating oil to mechanical part including the power distribution integration mechanism 30, and a hybrid electronic control unit 70 that controls the whole power output apparatus.

The engine 22 is an internal combustion engine that utilizes a hydrocarbon fuel, such gas gasoline or light oil, to output power. An engine electronic control unit (hereafter referred to as engine ECU) 24 inputs signals from a diversity of sensors that detect driving conditions of the engine 22, for example, a water temperature sensor 25 that measures the temperature of cooling water for cooling down the engine 22, and controls operations of the engine 22, for example, through fuel injection control, ignition control, and intake air flow regulation. The engine ECU 24 communicates with the hybrid electronic control unit 70 to control the operations of the engine 22 in response to control signals output from the hybrid electronic control unit 70 and to output data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the motor MG2. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The ring gear 32 is mechanically linked with front driving wheels 39a and 39b via a belt 36, a gear mechanism 37, and a differential gear 38. The power output to the ring gear 32 is thus transmitted to the driving wheels 39a and 39b via the belt 36, the gear mechanism 37, and the differential gear 38. The power output apparatus has three shafts linked with the power distribution and integration mechanism 30. The three shafts include the crankshaft 26 that is coupled with the carrier 34 and is the output shaft of the engine 22, a sun gear shaft 31a that is coupled with the sun gear 31 and is a rotating shaft of the motor MG1, and a ring gear shaft 32a that is coupled with the ring gear 32 and is mechanically linked with the driving wheels 39a and 39b.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power; When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The oil pump 60 is constructed as an internal gear pump driven by the crankshaft 26 and feeds the supply of lubricating oil kept in a sump 62 to the mechanical part including the power distribution integration mechanism 30.

The hybrid electronic control unit 70 is constructed as a microprocessor and includes a CPU 72, a ROM 74 that stores processing programs, a RAM 76 that temporarily stores data, a timer 78 that counts time, an input-output port (not shown), and a communication port (not shown). The hybrid electronic control unit 70 receives various measurement data via the input port; motor temperatures from temperature sensors 45 and 46 attached to the motors MG1 and MG2, an oil temperature from a temperature sensor attached to the sump 62, an ignition signal from an ignition switch 80, a gearshift position SP from a gearshift position sensor 82 that detects the position of a gearshift lever 81, an accelerator opening AP from an accelerator pedal position sensor 84 that detects the step-on amount of an accelerator pedal 83, a brake pedal position BP from a brake pedal position sensor 86 that detects the step-on amount of a brake pedal 85, and a vehicle speed V from a vehicle speed sensor 88. The hybrid electronic control unit 70 is connected with the engine ECU 24, the motor ECU 40, and the battery ECU 52 via the communication port as discussed above and transmits various control signals and data to and from the engine ECU 24, the motor ECU 40, and the battery ECU 52.

The hybrid vehicle 20 of the embodiment has a motor (not shown) that is capable of inputting and outputting power from and to an axle of left and right rear wheels through transmission of electric power to and from the battery 50. This motor of inputting and outputting power from and to the axle of left and right rear wheels and the control procedure of the motor are not characteristic of the present invention and are thus not specifically described here.

The following describes the operations of the hybrid vehicle 20 of the embodiment thus constructed. The description especially regards actuation control of the oil pump 60 in response to an ON operation of the ignition switch 80 and actuation control of the oil pump 60 in an EV drive mode that causes the hybrid vehicle 20 to run with the power from the motor MG2 while the engine 22 is at a stop.

Figure 2:
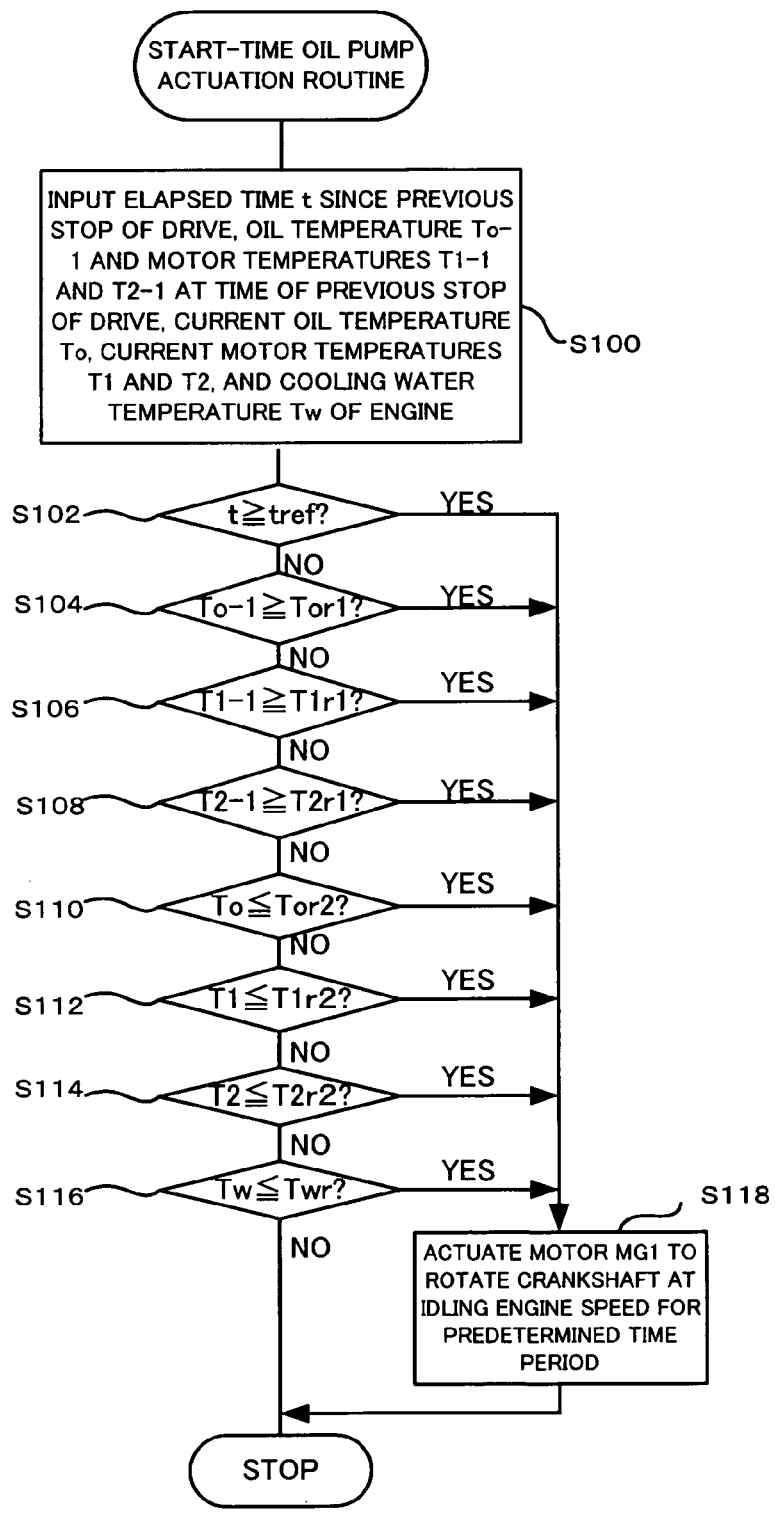
FIG. 2 is a flowchart showing a start-time oil pump actuation routine executed by the hybrid electronic control unit 70 in response to an ON operation of the ignition switch 80 in the embodiment.
Figure 3:
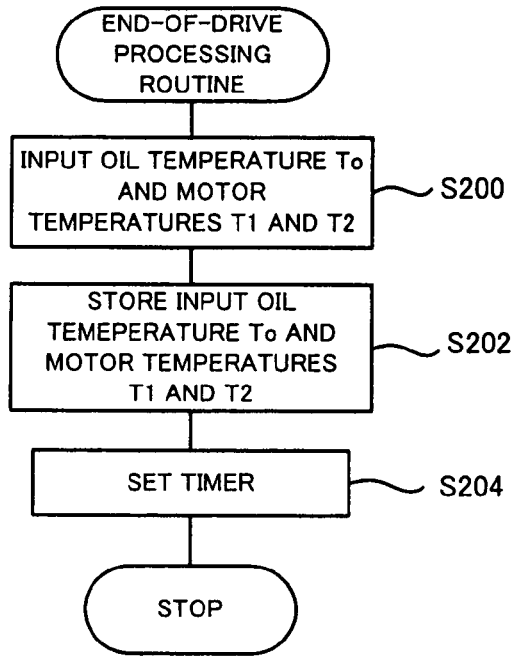
FIG. 3 is a flowchart showing an end-of-drive processing routine executed by the hybrid electronic control unit 70 in response to an OFF operation of the ignition switch 80 in the embodiment.

FIG. 2 is a flowchart showing a start-time oil pump actuation routine executed by the hybrid electronic control unit 70 in response to an ON operation of the ignition switch 80 in the embodiment. When the program enters this routine, the CPU 72 of the hybrid electronic control unit 70 first reads an elapsed time t since a previous stop of drive from the timer 78, an oil temperature T0-1 and temperatures T1-1 and T2-1 of the motors MG1 and MG2 at the time of the previous stop of drive, which are stored in a preset area of the RAM 76, a current oil temperature To measured by the temperature sensor 64, current temperatures T1 and T2 of the motors MG1 and MG2 measured by the temperature sensors 45 and 46, and a cooling water temperature T2 of the engine 22 measured by the water temperature sensor 25 (step S100). In response to an OFF operation of the ignition switch 80 at the time of the previous stop of drive, an end-of-drive processing routine shown in the flowchart of FIG. 3 is executed by the hybrid electronic control unit 70 to store the elapsed time t since the previous stop of drive and the oil temperature T0-1 and the temperatures T1-1 and T2-1 of the motors MG1 and MG2 at the time of the previous stop of drive into the preset area of the RAM 76 and to set the timer 78. According to the end-of-drive processing routine of FIG. 3, the CPU 72 of the hybrid electronic control unit 70 reads the oil temperature To and the temperatures T1 and T2 of the motors MG1 and MG2 measured by the temperature sensors 64, 45, and 46 (step S200), stores the input oil temperature To and motor temperatures T1 and T2 into the preset area of the RAM 76 (step S202), and sets the timer 78 (step S204). Among the data input at step S100 in the flowchart of FIG. 2, the cooling water temperature Tw is received from the engine ECU 24 via communication.

After reading the respective values, the CPU 72 successively determines whether the input elapsed time t since the previous stop of drive is not less than a preset reference time tref (step S102), whether the input oil temperature T0-1 at the time of previous stop of drive is not less than a preset $1^{st}$ oil temperature Tor1 (step S104), whether the input temperature T1-1 of the motor MG1 at the time of previous stop of drive is not less than a preset $1^{st}$ motor 1 temperature T1$r$1 (step S106), whether the input temperature T2-1 of the motor MG2 at the time of previous stop of drive is not less than a preset $1^{st}$ motor 2 temperature T2$r$1 (step S108), whether the input current oil temperature To is not greater than a preset $2^{nd}$ oil temperature Tor2 (step S110), whether the input current temperature T1 of the motor MG1 is not greater than a preset $2^{nd}$ motor 1 temperature T1$r$2 (step S112), whether the input current temperature T2 of the motor MG2 is not greater than a preset $2^{nd}$ motor 2 temperature T2$r$2 (step S114), and whether the input current cooling water temperature Tw of the engine 22 is not greater than a preset cooling water temperature Twr (step S116).

The supply of lubricating oil fed to the power distribution integration mechanism 30 drips to be accumulated in the sump 62 with elapse of time. The preset reference time tref is accordingly set as a time period requiring a new supply of lubricating oil to the power distribution integration mechanism 30. The lubricating oil fed to the power distribution integration mechanism 30 has the lower viscosity with the higher oil temperature at the time of stop of drive. The preset $1^{st}$ oil temperature Tor1 is accordingly set by reflecting the easiness in dripping of the lubricating oil from the power distribution integration mechanism 30. The temperatures T1-1 and T2-1 of the motors MG1 and MG2 at the time of previous stop of drive reflect the oil temperature at the moment. As in the case of the preset $1^{st}$ oil temperature Tor1, the preset $1^{st}$ motor 1 temperature T1$r$1 and the preset $1^{st}$ motor 2 temperature T2$r$1 are thus set by reflecting the easiness in dripping of the lubricating oil from the power distribution integration mechanism 30. The temperature of the lubricating oil reflects the elapsed time since the previous stop of drive and the difficulty in circulation of the lubricating oil. The preset $2^{nd}$ oil temperature Tor2 is thus set by taking into account the time period requiring a new supply of lubricating oil and the viscosity suitable for the sufficient lubricating performance of the lubricating oil. The current temperatures T1 and T2 of the motors MG1 and MG2 reflect the current oil temperature. As in the case of the preset $2^{nd}$ oil temperature Tor2, the preset $2^{nd}$ motor temperature T1$r$2 and the preset $2^{nd}$ motor 2 temperature T2$r$2 are thus set by taking into account the time period requiring a new supply of lubricating oil and the viscosity suitable for the sufficient lubricating performance of the lubricating oil. The current cooling water temperature Tw of the engine 22 reflects the current oil temperature. As in the case of the preset $2^{nd}$ oil temperature Tor2, the preset cooling water temperature Twr is thus set by taking into account the time period requiring a new supply of lubricating oil and the viscosity suitable for the sufficient lubricating performance of the lubricating oil.

In the case of a negative answer at all the decision points S102 through S116, the CPU 72 determines that a new supply of lubricating oil is not required and terminates the start-time oil pump actuation routine. In the case of an affirmative answer at any of the decision points S102 through S116, on the other hand, the CPU 72 determines that a new supply of lubricating oil is required and controls actuation of the motor MG1 to rotate the crankshaft 26 of the engine 22 at an idling engine speed for a predetermined time period (step S118). The program then exits from this start-time oil pump actuation routine. Rotation of the crankshaft 26 at the idling engine speed actuates the oil pump 60, which works to feed a new supply of lubricating oil from the sump 62 to the mechanical part including the power distribution integration mechanism 30. The control stops rotation of the crankshaft 26 after elapse of the predetermined time period, which is set to be sufficient for the supply of lubricating oil. Further rotation of the crankshaft 26 causes an undesirable overall energy loss of the power output apparatus. In order to rotate the crankshaft 26 at the idling engine speed, the sun gear shaft 31$a$ is rotated by the motor MG1 at a revolving speed Ns1 calculated by Equation (1) given below:

$$Ns1 = Ne1 \cdot (1+\rho)/\rho \quad (1)$$

Figure 4:
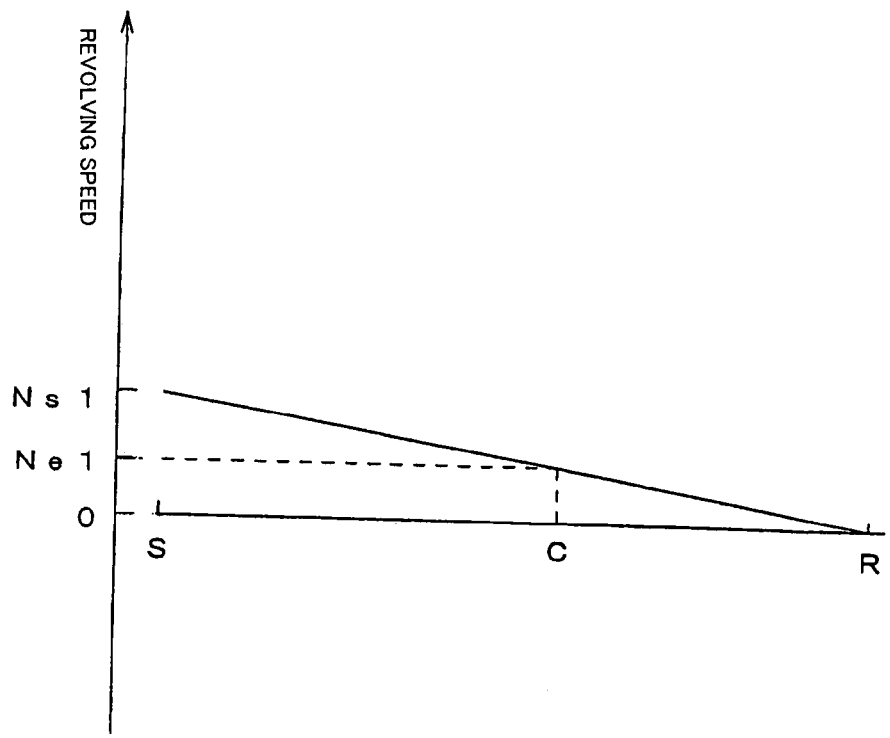
FIG. 4 is an alignment chart showing the revolving speeds of the respective shafts in the power distribution integration mechanism 30 when the crankshaft 26 rotates at an idling engine speed at a start time.

Here Ne1 denotes the idling speed of the engine 22 and $\rho$ denotes a gear ratio (a ratio of the number of teeth of the sun gear to the number of teeth of the ring gear) in the power distribution integration mechanism 30. FIG. 4 is an alignment chart of the power distribution integration mechanism 30 when the crankshaft 26 rotates at the idling engine speed Ne1. In the chart of FIG. 4, S, C, and R respectively represent the sun gear, the carrier, and the ring gear.

As discussed above, the hybrid vehicle 20 of the embodiment executes the start-time oil pump actuation routine in response to the ON operation of the ignition switch 80 to determine the requirement for a supply of lubricating oil to the mechanical part including the power distribution integration mechanism 30 at the start time and actually feed the supply of lubricating oil to the mechanical part including the power distribution integration mechanism 30 according to the requirements. When the supply of lubricating oil is required, actuation of the motor MG1 is controlled to rotate the crankshaft 26 for only the predetermined time period at the idling engine speed that allows for supply of the lubricating oil. This arrangement desirably prevents unnecessary energy consumption and thereby improves the overall energy efficiency of the whole power output apparatus.

The start-time oil pump actuation routine of the embodiment consecutively gives decisions with regard to the elapsed time t since the previous stop of drive, the oil temperature T0-1 at the time of previous stop of drive, the temperature T1-1 of the motor MG1 at the time of previous stop of drive, the temperature T2-1 of the motor MG2 at the time of previous stop of drive, the current oil temperature To, the current temperature T1 of the motor MG1, the current temperature T2 of the motor MG2, and the cooling water temperature Tw of the engine 22. These decisions may be made inconsecutively. As other modifications, only one of these decisions may be made or any combination of these decisions may be made. Another modification does not make any of these decisions but controls actuation of the motor MG1 to rotate the crankshaft 26 at the idling engine speed for a predetermined time period without any conditions in response to the ON operation of the ignition switch 80. Still another modification controls actuation of the motor MG1 to rotate the crankshaft 26 at a predetermined revolving speed (for example, the idling engine speed) for a predetermined time period in an EV drive mode, based on the result of any of the above decisions. In the EV drive mode, the hybrid vehicle 20 starts running with only the power from the motor MG2 in response to the ON operation of the ignition switch 80, while the engine 22 is at a stop.

In the structure of the embodiment, the cooling water temperature Tw of the engine 22 reflecting the oil temperature To is used for the decision. The cooling water temperature Tw of the engine 22 may be replaced with the temperature of the engine 22, since the temperature of the engine 22 also reflects the oil temperature To.

Figure 5:
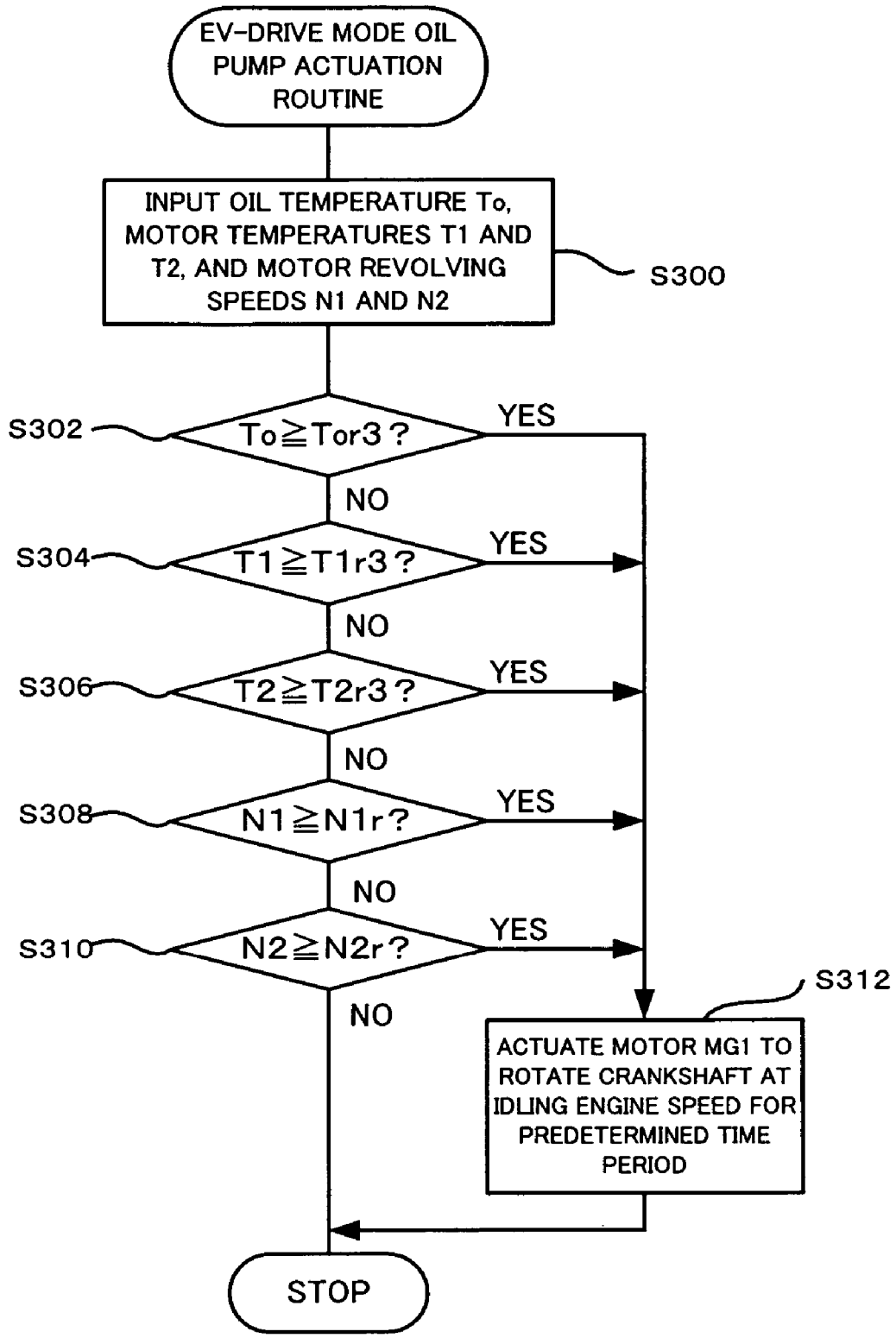
FIG. 5 is a flowchart showing an EV drive-mode oil pump actuation routine executed by the hybrid electronic control unit 70 in an EV drive mode in the embodiment.

The following describes control of actuation of the oil pump 60 in the EV drive mode, where the hybrid vehicle 20 runs with only the power from the motor MG2 while the engine 22 is at a stop. FIG. 5 is a flowchart showing an EV drive-mode oil pump actuation routine executed by the hybrid electronic control unit 70 in the EV drive mode in the embodiment. This routine is repeatedly carried out at preset time intervals (for example, at every 5 minutes).

When the program enters the EV-drive mode oil pump actuation routine, the CPU 72 of the hybrid electronic control unit 70 first reads the oil temperature To measured by the temperature sensor 64, the temperatures T1 and T2 of the motors MG1 and MG2 measured by the temperature sensors 45 and 46, and revolving speed N1 and N2 of the motors MG1 and MG2 (step S300). The revolving speed N1 and N2 of the motors MG1 and MG2 are received from the motor ECU 40 via communication. The revolving speeds N1 and N2 of the motors MG1 and MG2 respectively represent the revolving speed of the sun gear shaft 31$a$ as the rotating shaft connecting with the power distribution integration mechanism 30 and the revolving speed of the ring gear shaft 32$a$ as the drive shaft connecting with the power distribution integration mechanism 30.

After reading the respective values, the CPU 72 successively determines whether the input oil temperature To is not less than a preset $3^{rd}$ oil temperature Tor3 (step S302), whether the input temperature T1 of the motor MG1 is not less than a preset $3^{rd}$ motor 1 temperature T1$r$3 (step S304), whether the input temperature T2 of the motor MG2 is not less than a preset $3^{rd}$ motor 2 temperature T2r3 (step S306), whether the input revolving speed N1 of the motor MG1 is not less than a preset motor 1 revolving speed N1r (step S308), and whether the input revolving speed N2 of the motor MG2 is not less than a preset motor 2 revolving speed N2r (step S310). Here the preset $3^{rd}$ oil temperature Tor3 is set in a specific range that prevents burn-out of the mechanical part including the power distribution integration mechanism 30. The temperatures T1 and T2 of the motors MG1 and MG2 reflect the oil temperature To. As in the case of the preset $3^{rd}$ oil temperature Tor3, the preset $3^{rd}$ motor 1 temperature T1r3 and the preset $3^{rd}$ motor 2 temperature T2r3 are thus set in the specific range that prevents burn-out of the mechanical part including the power distribution integration mechanism 30. The revolving speeds N1 and N2 of the motors MG1 and MG2 reflect the potential for a burn-out of the mechanical part including the power distribution integration mechanism 30. The preset motor 1 revolving speed N1r and the preset motor 2 revolving speed N2r are thus set in the specific range that prevents a burn-out of the mechanical part including the power distribution integration mechanism 30.

In the case of a negative answer at all the decision points S302 through S310, the CPU 72 determines that a new supply of lubricating oil is not required and terminates the EV-drive mode oil pump actuation routine. In the case of an affirmative answer at any of the decision points S302 through S310, on the other hand, the CPU 72 determines that a new supply of lubricating oil is required and controls actuation of the motor MG1 to rotate the crankshaft 26 of the engine 22 at the idling engine speed for a predetermined time period in the EV drive mode (step S312). The program then exits from this EV-drive mode oil pump actuation routine. As discussed previously, rotation of the crankshaft 26 at the idling engine speed actuates the oil pump 60, which works to feed a new supply of lubricating oil from the sump 62 to the mechanical part including the power distribution integration mechanism 30. The control stops rotation of the crankshaft 26 after elapse of the predetermined time period, which is set to be sufficient for the supply of lubricating oil. Further rotation of the crankshaft 26 causes an undesirable overall energy loss of the power output apparatus. In order to rotate the crankshaft 26 at the idling engine speed in the EV drive mode, the sun gear shaft 31a is rotated by the motor MG1 at a revolving speed Ns2 calculated by Equation (2) given below:

$$Ns2=Nr2-(Nr2-Ne1)\cdot(1+\rho)/\rho \quad (2)$$

Figure 6:
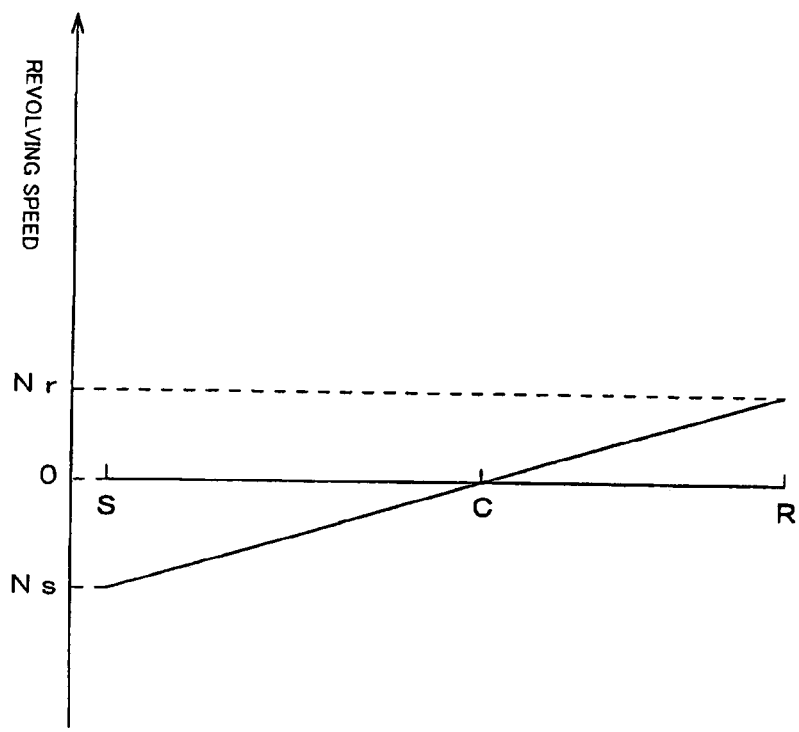
FIG. 6 is an alignment chart showing the revolving speeds of the respective shafts in the power distribution integration mechanism 30 before the crankshaft 26 rotates at the idling engine speed in the EV drive mode.
Figure 7:
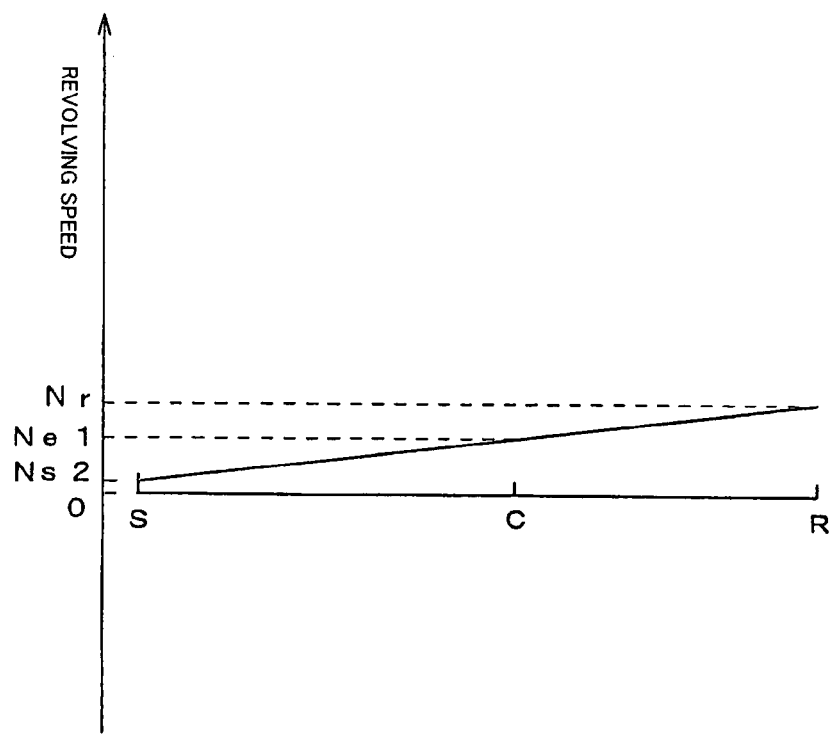
FIG. 7 is an alignment chart showing the revolving speeds of the respective shafts in the power distribution integration mechanism 30 when the crankshaft 26 rotates at the idling engine speed in the EV drive mode.

Here Nr2 denotes the revolving speed of the ring gear 32 that is identical with the revolving speed N2 of the motor MG2. FIG. 6 is an alignment chart of the power distribution integration mechanism 30 before the crankshaft 26 rotates at the idling engine speed in the EV drive mode. FIG. 7 is an alignment chart of the power distribution integration mechanism 30 when the crankshaft 26 rotates at the idling engine speed in the EV drive mode.

As discussed above, the hybrid vehicle 20 of the embodiment executes the EV-drive mode oil pump actuation routine to determine the requirement for a supply of lubricating oil to the mechanical part including the power distribution integration mechanism 30 in the EV drive mode and actually feed the supply of lubricating oil to the mechanical part including the power distribution integration mechanism 30 according to the requirements. When the supply of lubricating oil is required, actuation of the motor MG1 is controlled to rotate the crankshaft 26 for only the predetermined time period at the idling engine speed that allows for supply of the lubricating oil. This arrangement desirably prevents unnecessary energy consumption and thereby improves the overall energy efficiency of the whole power output apparatus.

The EV-drive mode oil pump actuation routine of the embodiment consecutively gives decisions with regard to the oil temperature To, the temperature T1 of the motor MG1, the temperature T2 of the motor MG2, the revolving speed N1 of the motor MG1, and the revolving speed N2 of the motor MG2. These decisions may be made inconsecutively. As other modifications, only one of these decisions may be made or any combination of these decisions may be made. Another modification does not make any of these decisions but controls actuation of the motor MG1 to rotate the crankshaft 26 at a preset revolving speed (for example, the idling engine speed) for a predetermined time period at every elapse of a specified time period.

The above embodiment regards the hybrid vehicle 20 with the power output apparatus mounted thereon. The power output apparatus of the embodiment may be mounted on vehicles other than automobiles, for example, trains, as well as on aircraft, boats and ships, and construction machines.

The above embodiment is to be considered in all aspects as illustrative and not restrictive. There may be many modifications, changes, and alterations without departing from the scope or sprit of the main characteristics of the present invention. All changes within the meaning and range of equivalency of the claims are therefore intended to be embraced therein.

What is claimed is:

1. A power output apparatus, that outputs power to a drive shaft, said power output apparatus comprising:
   an internal combustion engine;
   a drive shaft motor that is capable of inputting and outputting power to and from said drive shaft;
   a three-shaft-type power input output mechanism connecting with an output shaft of said internal combustion engine, said drive shaft, and a rotating shaft, where settings of power input and output to and from any two shafts among said three shafts automatically specify a setting of power input and output to and from a residual shaft among said three shafts;
   a rotating shaft motor that is capable of inputting and outputting power to and from said rotating shaft;
   a battery that transmits electric power to and from said drive shaft motor and said rotating shaft motor;
   a lubricating oil feed pump that is linked to said output shaft of said internal combustion engine via a damper and is driven by power of said output shaft of said internal combustion engine to feed a supply of lubricating oil to at least a portion of mechanical part of said power output apparatus; and
   a controller that, when a starter switch for starting said power output apparatus is an ON operation and a, predetermined condition for temperature status in said power output apparatus is fulfilled in an operation stop state of said internal combustion engine, controls actuation of said rotating shaft motor to drive said lubricating oil feed pump with the power output to said output shaft of said internal combustion engine via said three-shaft-type power input output mechanism.

2. The power output apparatus in accordance with claim 1, said power output apparatus further comprising:
   a temperature sensor that measures temperature of the lubricating oil,
   wherein said controller adopts a condition that the temperature of the lubricating oil measured by said temperature sensor is not less than a preset lubricating oil temperature in an operation stop state of said power output apparatus immediately before an ON operation of the starter switch, as the predetermined condition of the control.

3. The power output apparatus in accordance with claim 1, said power output apparatus further comprising:
a temperature sensor that measures temperature of the lubricating oil,
wherein said controller adopts a condition that the temperature of the lubricating oil measured by said temperature sensor is not greater than a preset lubricating oil temperature at an ON time of the starter switch, as the predetermined condition of the control.

4. The power output apparatus in accordance with claim 1, said power output apparatus further comprising:
a temperature sensor that measures temperature of said drive shaft motor,
wherein said controller adopts a condition that the temperature of said drive shaft motor measured by said temperature sensor is not less than a preset motor temperature in an operation stop state of said power output apparatus immediately before an ON operation of the starter switch, as the predetermined condition of the control.

5. The power output apparatus in accordance with claim 1, said power output apparatus further comprising:
a temperature sensor that measures temperature of said drive shaft motor,
wherein said controller adopts a condition that the temperature of said drive shaft motor measured by said temperature sensor is not greater than a preset motor temperature at an ON time of the starter switch, as the predetermined condition of the control.

6. The power output apparatus in accordance with claim 1, said power output apparatus further comprising:
a temperature sensor that measures temperature of said rotating shaft motor,
wherein said controller adopts a condition that the temperature of said rotating shaft motor measured by said temperature sensor is not less than a preset motor temperature in an operation stop state of said power output apparatus immediately before an ON operation of the starter switch, as the predetermined condition of the control.

7. The power output apparatus in accordance with claim 1, said power output apparatus further comprising:
a temperature sensor that measures temperature of said rotating shaft motor,
wherein said controller adopts a condition that the temperature of said rotating shaft motor measured by said temperature sensor is not greater than a preset motor temperature at an ON time of the starter switch, as the predetermined condition of the control.

8. The power output apparatus in accordance with claim 1, said power output apparatus further comprising:
a temperature sensor that measures temperature of said internal combustion engine,
wherein said controller adopts a condition that the temperature of said internal combustion engine measured by said temperature sensor is not greater than a preset combustion engine temperature at an ON time of the starter switch, as the predetermined condition of the control.

9. The power output apparatus in accordance with claim 1, wherein said controller controls actuation of said rotating shaft motor when a condition that makes said drive shaft motor output power to said drive shaft is fulfilled in addition to fulfillment of the predetermined condition.

10. A power output apparatus that outputs power to a drive shaft, said power output apparatus comprising:
an internal combustion engine;
a drive shaft motor that is capable of inputting and outputting power to and from said drive shaft;
a three-shaft-type power input output mechanism connecting with an output shaft of said internal combustion engine, said drive shaft, and a rotating shaft, where settings of power input and output to and from any two shafts among said three shafts automatically specify a setting of power input and output to and from a residual shaft among said three shafts;
a rotating shaft motor that is capable of inputting and outputting power to and from said rotating shaft;
a battery that transmits electric power to and from said drive shaft motor and said rotating shaft motor;
a lubricating oil feed pump that is linked to said output shaft of said internal combustion engine via a damper and is driven by power of said output shaft of said internal combustion engine to feed a supply of lubricating oil to at least a portion of mechanical part of said power output apparatus; and
a controller that, when a condition that said drive shaft motor is outputting power to said drive shaft is fulfilled and a predetermined condition for either one of temperature status in said power output apparatus and revolving status in said power output apparatus is fulfilled in an operation stop state of said internal combustion engine, controls actuation of said rotating shaft motor to drive said lubricating oil feed pump with the power output to said output shaft of said internal combustion engine via said three-shaft-type power input output mechanism.

11. The power output apparatus in accordance with claim 10, said power output apparatus further comprising:
a temperature sensor that measures temperature of the lubricating oil,
wherein said controller adopts a condition that the temperature of the lubricating oil measured by said temperature sensor is not less than a preset lubricating temperature, as the predetermined condition of the control.

12. The power output apparatus in accordance with claim 10, said power output apparatus further comprising:
a temperature sensor that measures temperature of said drive shaft motor,
wherein said controller adopts a condition that the temperature of said drive shaft motor measured by said temperature sensor is not less than a preset motor temperature, as the predetermined condition of the control.

13. The power output apparatus in accordance with claim 10, said power output apparatus further comprising:
a temperature sensor that measures temperature of said rotating shaft motor,
wherein said controller adopts a condition that the temperature of said rotating shaft motor measured by said temperature sensor is not less than a preset motor temperature, as the predetermined condition of the control.

14. The power output apparatus in accordance with claim 10, said power output apparatus further comprising:
a speed sensor that measures a revolving speed of said drive shaft, wherein said controller adopts a condition that the revolving speed of said drive shaft measured by said speed sensor is not less than a preset revolving speed, as the predetermined condition of the control.

15. The power output apparatus in accordance with claim 10, said power output apparatus further comprising:
    a speed sensor that measures a revolving speed of said rotating shaft,
    wherein said controller adopts a condition that the revolving speed of said rotating shaft measured by said speed sensor is not less than a preset revolving speed, as the predetermined condition of the control.

16. A power output apparatus that outputs power to a drive shaft, said power output apparatus comprising:
    an internal combustion engine;
    a drive shaft motor that is capable of inputting and outputting power to and from said drive shaft;
    a three-shaft-type power input output mechanism connecting with an output shaft of said internal combustion engine, said drive shaft, and a rotating shaft, where settings of power input and output to and from any two shafts among said three shafts automatically specify a setting of power input and output to and from a residual shaft among said three shafts;
    a rotating shaft motor that is capable of inputting and outputting power to and from said rotating shaft;
    a battery that transmits electric power to and from said drive shaft motor and said rotating shaft motor;
    a lubricating oil feed pump that is linked to said output shaft of said internal combustion engine via a damper and is driven by power of said output shaft of said internal combustion engine to feed a supply of lubricating oil to at least a portion of mechanical part of said power output apparatus; and
    a controller that, when a predetermined condition is fulfilled in an operation stop state of said internal combustion engine, controls actuation of said rotating shaft motor for a predetermined time period to drive said lubricating oil feed pump with the power output to said output shaft of said internal combustion engine via said three-shaft-type power input output mechanism,
    wherein said rotating shaft motor, said drive shaft motor, and said lubricating oil feed pump are arranged in series.

* * * * *